The present invention relates to improvements in the art of converting hydrocarbons to more valuable isomers and is particularly directed to the catalytic isomerization of straight chain paraffin hydrocarbons to the corresponding branched chain hydrocarbons. The invention is especially concerned with the isomerization of normal paraffin hydrocarbons of from 4 to 7 carbon atoms.

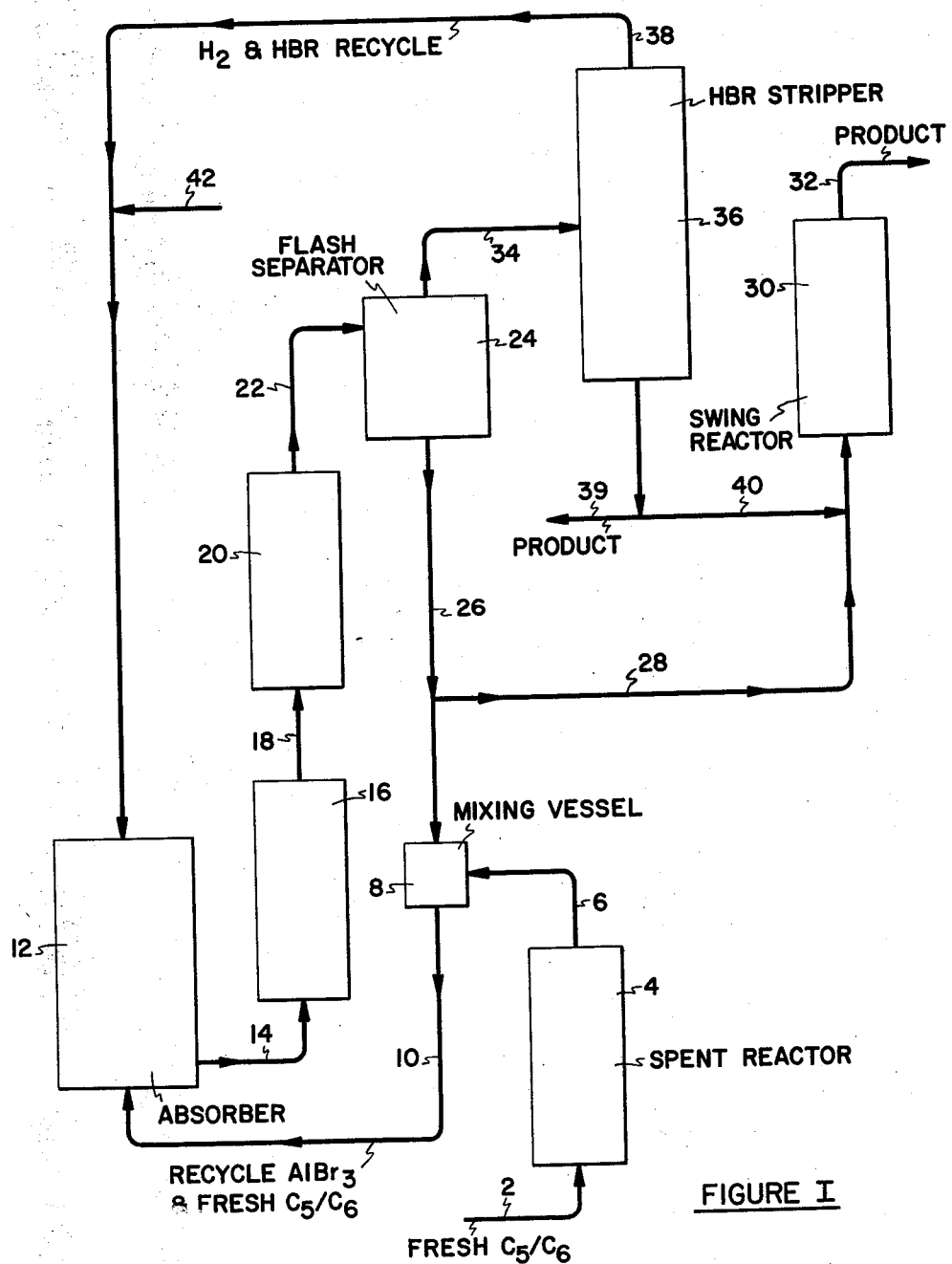

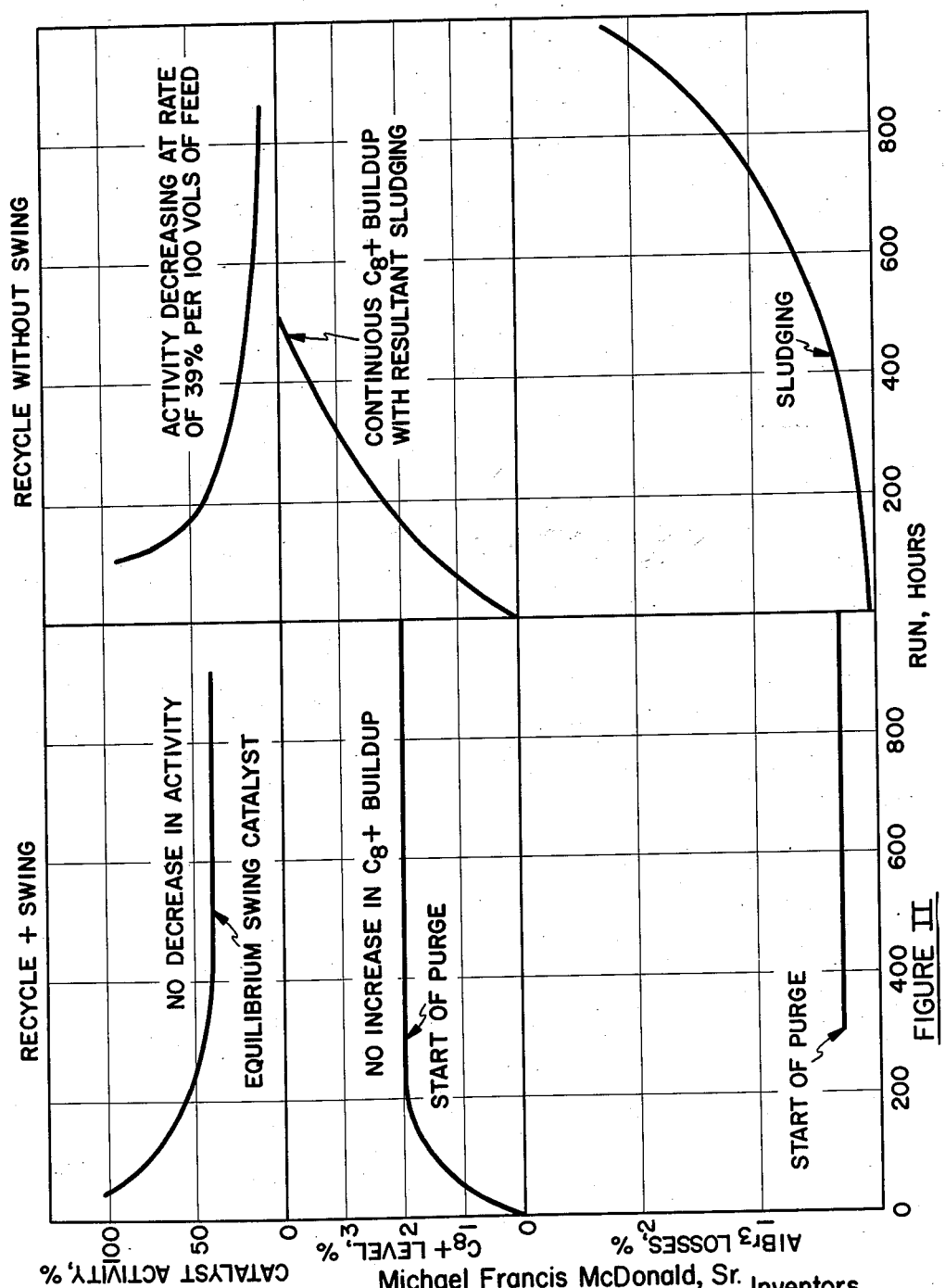
Feb. 12, 1963 M. F. McDONALD, SR., ET AL 3,077,504
ALUMINUM HALIDE RECYCLE ISOMERIZATION PROCESS
Filed June 9, 1960 2 Sheets-Sheet 2
FIGURE II
Michael Francis McDonald, Sr.
Gordon Byron Jolley  Inventors
By Richard H. Nagel  Patent Attorney 3,077,504
ALUMINUM HALIDE RECYCLE
ISOMERIZATION PROCESS
Michael Francis McDonald, Sr., and Gordon Byron Jolley, Baton Rouge, La., assignors to Esso Research and Engineering Company, a corporation of Delaware
Filed June 9, 1960, Ser. No. 34,951
8 Claims. (Cl. 260—683.67)

With the continued progress of the automotive industry there has been more and more emphasis on the use of gasoline engines with greater compression ratios to obtain higher efficiency. In order to satisfy the requirements of such engines it has been necessary for petroleum refiners to provide motor fuels of increasingly greater octane rating. Among the available processes that can be used for upgrading the light naphtha components of such fuels isomerization appears to be very valuable from an economic standpoint. Furthermore, it may be stated as a general proposition that the isoparaffinic and branched chain paraffin hydrocarbons are of greater commercial value to the petroleum industry than the corresponding normal or straight chain paraffin hydrocarbons. Thus for example, 2,2-dimethyl butane has a higher octane rating than the isomeric normal hexane. Isobutane is more valuable than normal butane since the former can be used as the basis for the preparation of 8-carbon-atom branched chain hydrocarbons by alkylation with butylene.

The isomerization of normal paraffin hydrocarbons of from 4 to 7 carbon atoms to the corresponding branched chain homologs is well known. For effecting the isomerization it is customary to employ certain metal halides, particularly aluminum chloride or aluminum bromide, in conjunction with certain promoters such as hydrogen chloride, hydrogen bromide or boron fluoride. Insofar as the isomerization of the hydrocarbons in light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g., in the range of about 60° to about 150° F.

The isomerization activity of aluminum bromide is markedly increased when the reaction is carried out in the presence of a two-phase catalyst system. Such a system consists of (1) a solid catalyst phase, which may be $AlBr_3$ supported on or closely associated with certain catalyst supports, notably certain oxides such as calcined bauxite, alumina, silica, molybdena and the like, and (2) a dissolved phase consisting of aluminum bromide in solution in the hydrocarbon undergoing isomerization in the liquid phase. Furthermore, continuous addition of hydrogen bromide to the hydrocarbon undergoing isomerization enhances considerably the catalyst activity.

The catalyst support may initially be impregnated with the $AlBr_3$ in the following manner: It may be dissolved in a suitable solvent, such as light naphtha or its hydrocarbon components and the support is impregnated with this solution. It is advantageous that the naphtha or hydrocarbon components to be isomerized be used as a solvent in preference to other solvents in which aluminum bromide is soluble such as ethylene dichloride or dioxane since non-hydrocarbon solvents will have to be stripped from the support prior to use. The amount of $AlBr_3$ adsorbed depends upon the surface area and affinity of the support, and will vary from 20 to 80% by weight of support for calcined bauxite to 20 to 60% for molybdenum oxide supported on alumina.

Desirable as it is to use $AlBr_3$ as an isomerization catalyst, particularly in view of the favorable equilibrium yields obtainable at the low operating temperatures, processing difficulties associated with its use have discouraged widespread application. In the first place, it is more expensive than the much less soluble $AlCl_3$, and so losses must be maintained at a minimum. Then, aromatics, olefins, sulfur and water are detrimental to the isomerization process, and thus feed streams must be subjected to costly purification procedures. Thirdly, catalyst activity is in part a function of its concentration in the feed, and thus it is important not only to recover catalyst from the reaction product, but also to recycle this recovered catalyst back to the reaction system. For instance, isomerizate containing 1 to 5% $AlBr_3$ in solution is flashed to remove overhead the desired hydrocarbon product, while the bottoms containing the aluminum bromide and cracking inhibitors, such as naphthenes, is recycled to the isomerization zone. Such a process, however, has been found not to be completely satisfactory. In the course of the reaction when a $C_5/C_6$ stream is being isomerized, a certain small amount of secondary reaction products is formed. This material, containing hydrocarbons having 8 and more carbon atoms, and whose nature is not completely understood, is quite harmful to the catalyst under isomerization conditions, causing sludging and catalyst deactivation resulting in rapid decline of yield as well as catalyst loss.

It is the principal object of the present invention to set forth a novel processing sequence wherein a hydrocarbon stream may be isomerized with an aluminum bromide catalyst and wherein the catalyst is recycled to the reaction zone without causing catalyst deactivation and sludging.

It is a further object of the present invention to set forth a novel $AlBr_3$ isomerization processing sequence wherein an aromatics, and specifically a benzene containing feed can be processed without catalyst deactivation.

Other and further objects and advantages of the present invention will become more apparent hereinafter.

In accordance with the present invention, these objects and advantages are achieved by maintaining at least one, but preferably a series of isomerization reactors containing the supported isomerization catalyst under isomerization conditions of temperature and pressure. Further, there is present a reactor containing initially a bed of support but without isomerization catalyst. Further, there is present, particularly after a substantial on stream period, an isomerization reactor in series with the other reactors which has become spent or relatively inactive. The fresh feed, which may be a virgin $C_5/C_6$ naphtha, is preferably passed through or over this spent reactor bed, containing $AlBr_3$ on Porocel, and the latter removes most of the olefins, sulfur and water from the feed.

The treated feed may now be mixed with the $AlBr_3$ bottoms solution resulting from the flash separation of the isomerization product and the mixture, containing about 3% $AlBr_3$, is fed to an absorber tower wherein about 10% of HBr is added and, if desired, about 1 mol percent hydrogen; the latter is desirable if benzene is present in the feed. The latter is now passed to the reaction train. Reaction product is passed to a flash separator distillation tower where the $AlBr_3$ is concentrated in a bottoms stream which is about 10% of the total product. The $C_8+$ product accumulates in this bottoms stream. In accordance with the present invention, a portion, about 10%, of this stream is used to purge the $C_8+$ from the system. This purge stream is fed to the reactor containing the support and initially no catalyst, and gradually there is built up therein an active catalyst bed. By this processing step, not only is all the AlBr$_3$ removed from the hydrocarbon to form an active catalyst bed, but also the C$_8$+ product is purged at about the same rate that it is formed, thus preventing its build-up in the system.

The process and nature of the present invention will be more readily understood when reference is made to the accompanying drawing, showing a preferred embodiment thereof. Referring now to FIGURE I, a feed stream for the process may be obtained from a suitable source through line 2. This feed stream may, for example, comprise a light naphtha feed or a refinery hexane cut, and may initially contain materials such as those enumerated that have a deleterious effect on catalyst, i.e., sulfur, olefin, water, and benzene. If desired, these components may be removed by a pretreatment step, as by adsorbents, hydrogenation, solvent extraction, and the like, but in a preferred embodiment this pretreatment is unnecessary.

The fresh feed is now passed into isomerization reactor 4, which has become relatively spent and is no longer active in isomerizing hydrocarbons. Such a reactor, however, is sufficient to decrease the olefin content of a typical feed from 0.1 to 0.004%, the sulfur from 0.025 to 0.001% and the water from 0.005 to 0.0001%. Benzene content, however, is not particularly affected.

The treated feed is passed via line 6 to mixing vessel 8 wherein it is intimately mixed with the AlBr$_3$ bottoms stream withdrawn from flash separator 24 described more fully below. The proportion of AlBr$_3$ containing bottoms and fresh feed is such that a stream containing about 1–5% AlBr$_3$, preferably about 3% AlBr$_3$, is withdrawn from vessel 8 via line 10. This stream will contain about 2% C$_8$ hydrocarbons and higher. The solution is passed to absorber tower 12 wherein 3 to 30% HBr, preferably about 9–10% by weight and, if more than about 0.02% of benzene is present in the feed, about 0.5 to 2.0 mol percent H$_2$ is added through lines 38 and 42. The bulk of this gas comes from recycle from stripper 36.

The feed containing the added gases is now passed into the first of a series of isomerization vessels. Preferably there are at least two active reactors, i.e. active under isomerization conditions, in service at all times. Both reactors 16 and 20 contain AlBr$_3$ supported on Porocel. Conditions in these vessels include temperatures of 40 to 150° F., preferably about 60 to 90° F., and pressures of 50 to 400 p.s.i.g., preferably 100 to 250 p.s.i.g. The hydrogen partial pressure (if used) is about 100 to 300 p.s.i.

In these reactors, besides conversion to isomerization product, about 0.1 to 0.3% of the undesirable C$_8$+ product is formed.

The reaction product from vessel 20 is now passed via line 22 to flash separator 24. This is a separator-distillation tower which serves to remove as an overhead stream the isomerizate as well as the gaseous additives. The conditions in this tower are about 220 to 300° F., a pressure of about 50 to 400 p.s.i.g., and preferably a short residence time of 30 minutes or less. The overhead product is passed via line 34 to stripper still 36 where light gases are withdrawn through line 38 for recycle as described.

Returning now to vessel 24, the bottoms product containing disolved AlBr$_3$, some secondary reaction products, naphthene cracking inhibitors and C$_8$+ product, is withdrawn through line 26. About 5 to 25%, preferably about 10% of this stream is passed via line 28 to vessel 30 containing initially the freshly calcined Porocel, along with the isomerizate product from line 28. A sufficient quantity of isomerizate from line 40 is combined with the separator bottoms from line 28 to give an overall AlBr$_3$ concentration of from 1 to 5%. Such a relatively high AlBr$_3$ concentration in vessel 30 insures a high AlBr$_3$ adsorption rate on the fresh Porocel, and thus more efficiently utilizing the available AlBr$_3$. Concentrations lower than 1% AlBr$_3$ permit a prohibitively high percentage of the AlBr$_3$ to pass through vessel 30 without being adsorbed, and thus is lost. Conditions in this vessel include temperatures of about 60° to 80° F., preferably about 70° F., about 1–5% (wt.) of AlBr$_3$ on hydrocarbon, and about 0.2% C$_8$+ on hydrocarbon. There being no HBr present, no further isomerization takes place, and all the AlBr$_3$ is removed from the hydrocarbon. The recovered isomerizate is passed to storage via line 32.

By keeping the isomerization system in balance, by the time reactor 30 becomes saturated with AlBr$_3$, the reactor longest on stream has become spent. Thereupon 30 becomes part of the isomerization reactor train and the spent reactor, for instance vessel 16, is now employed to pretreat the fresh incoming feed. Concurrently, the catalyst in spent reactor 4 has been removed and replaced with fresh calcined bauxite; it may, however, be restored in situ by NH$_3$ neutralization, water flushing and reactivation.

The C$_8$+ purge stream passing through line 28 is of such an amount that, when it is mixed with isomerizate from stripped 36 produces a combined stream to vessel 30 containing only 0.2% by weight of C$_8$+ product. The remainder of the C$_8$+ material is recycled along with the fresh feed. Since C$_8$+ is produced in the reactor to the extent of about 0.2 wt. percent, by operating in accordance with the present process and removing about 0.2%, build up of this undesirable material is prevented. It has not hitherto been possible to operate a high concentraton (2 to 5%) AlBr$_3$ isomerization process without this fatal C$_8$+ build up. These high AlBr$_3$ concentrations further are particularly essential when a benzene containing feed (0.5 to 6.0%) is being isomerized.

The process of the present invention may be modified in many details. Thus if a very low benzene feed is employed, the hydrogen addition may be omitted. Similarly, it may be desirable to isomerize with an aluminum chloride catalyst instead of AlBr$_3$. Although the reaction conditions, due to decreased solubilities, will be different, the principle in the reactor sequence will be the same.

FIGURE II demonstrates graphically the results obtained by operating in accordance with the present invention involving recycle of part of the AlBr$_3$ and absorbing all AlBr$_3$ eventually on a support, which subsequently becomes a reactor. This is sometimes referred to as the "swing" reactor. It will be noted that with the swing reactor and recycle, there is no decrease experienced after the reactor has lined out, for some 800 hours. With complete recycle but without swing, there is a steady catalyst decrease due to sludging and build up of the C$_8$+ product.

What is claimed is:

1. In a process wherein paraffinic hydrocarbons are isomerized in the liquid phase in the presence of a supported aluminum halide catalyst in a reaction zone, and a stream comprising isomerized hydrocarbons and dissolved aluminum halide is passed to a separation zone, an isomerization product substantially free of said halide is withdrawn from an upper portion of said zone while a solution of aluminum halide in hydrocarbon including hydrocarbonaceous material having eight or more carbon atoms is withdrawn from a lower portion of said separation zone and recycled to said reaction zone, the improvement which comprises maintaining at least two isomerization reaction zones in series under isomerization conditions, further maintaining a contacting zone initially containing a bed of catalyst-free metal oxide support, forming as an admixture a stream comprising at least a portion of said isomerization product free of aluminum halide and from 5 to 25% of said stream comprising aluminum halide in solution in hydrocarbon withdrawn from the lower portion of said separation zone, passing said admixture to said contacting zone thus depositing aluminum halide on said metal oxide support, withdrawing a substantially aluminum halide-free hydrocarbon from said zone, maintaining said flow until said bed is substantially saturated with said halide and thereafter passing isomerization feed under isomerization conditions into said zone.

2. In a process wherein paraffinic hydrocarbons are isomerized in the liquid phase in the presence of a supported aluminum bromide catalyst in a reaction zone, and a stream comprising isomerized hydrocarbons and dissolved aluminum bromide is passed to a flash distillation zone and an overhead stream comprising hydrogen bromide and isomerized hydrocarbons is passed to an HBr stripping zone and HBr-free isomerizate is withdrawn from said zone, and wherein a solution of $AlBr_3$ is hydrocarbon comprising hydrocarbons containing at least eight carbon atoms is withdrawn from the lower portion of said flash separation zone and recycled to said reaction zone, the improvement which comprises maintaining a plurality of isomerization zones in series, each of said zones containing a bed of $AlBr_3$ supported on a metal oxide support, further maintaining a contacting zone initially containing a bed of $AlBr_3$-free metal oxide support, passing fresh feed containing $AlBr_3$ in solution to said isomerization zone, forming isomerization product comprising material containing $C_8+$ hydrocarbons, passing said product to said separation zone, forming an admixture of from about 5 to 25% of said bottoms product of aluminum bromide and $C_8+$ product withdrawn from said separation zone and at least a portion of HBr-free isomerizate withdrawn from said stripping zone, passing said admixture to said contacting zone, recycling the remainder of said bottoms product to said isomerization zone, maintaining said flow streams until said contacting zone is substantially saturated with $AlBr_3$, and thereafter passing isomerization feed and HBr into said zone under isomerization conditions.

3. An improved isomerization process which comprises maintaining a series of isomerization zones containing $AlBr_3$ supported on Porocel under isomerization conditions to form an isomerization train, maintaining a contacting zone initially containing a bed of Porocel, passing isomerization feed through a bed of spent supported $AlBr_3$ catalyst in the absence of HBr to remove feed contaminants, thereafter mixing fresh feed with a solution of $AlBr_3$ in hydrocarbon, passing said mixture in the further presence of HBr into a series of reaction zones under isomerization conditions of temperature and pressure to form isomerization product, passing said isomerization product to a flash separation zone, withdrawing an overhead product comprising isomerizate and HBr, stripping HBr from said overhead in a stripping zone, withdrawing HBr-free product, withdrawing a bottoms product comprising $AlBr_3$ dissolved in hydrocarbon and containing small amounts of $C_8+$ product from said separation zone, passing 75 to 95% of said stream to a mixing zone wherein it is mixed with said treated fresh feed for passage to said reaction zone, passing 5 to 25% of said bottoms stream to a contacting zone containing initially a bed of Porocel, mixing a portion of said HBr-free isomerization product with said last named stream, depositing $AlBr_3$ on said bed, withdrawing a stream of isomerization product substantially free of $AlBr_3$ from said zone, maintaining said flow until said bed is essentially saturated with $AlBr_3$, thereafter passing partially converted feed stream comprising HBr from a prior isomerization zone to said last named zone and maintaining said zone under isomerization conditions.

4. The process of claim 3 wherein the most spent isomerization zone is removed from said train concomitant with the addition of said contacting zone to said train.

5. The process of claim 3 wherein isomerization conditions include temperatures of 40° to 150° F. and pressures of 50 to 400 p.s.i.g.

6. The process of claim 3 wherein sufficient HBr-free isomerizate is passed to said contacting zone to provide an overall concentration of $AlBr_3$ passed to said zone of from 1 to 5%.

7. The process of claim 3 wherein said feed to said isomerization train contains small amounts of benzene and wherein hydrogen is added to said isomerization zone.

8. The process of claim 3 wherein said contacting zone is maintained at a temperature in the range of 60° to 80° F. and the rate at which $C_8+$ product is passed to said contacting zone is substantially equal to the rate at which it is formed during the isomerization reaction.

References Cited in the file of this patent
UNITED STATES PATENTS

| | | |
|---|---|---|
| 2,403,181 | Jones | July 2, 1946 |
| 2,429,218 | Carney | Oct. 21, 1947 |
| 2,946,833 | Kimberlin et al. | July 26, 1960 |